K. T. McKINSTRY.
MEANS FOR SECURING VEHICLE SPRINGS.
APPLICATION FILED FEB. 3, 1919.

1,317,718.

Patented Oct. 7, 1919.

Inventor.
Kossuth T. McKinstry.

by, Lacey & Lacey
Attorneys.

UNITED STATES PATENT OFFICE.

KOSSUTH T. McKINSTRY, OF ATLANTA, GEORGIA.

MEANS FOR SECURING VEHICLE-SPRINGS.

1,317,718.   Specification of Letters Patent.   Patented Oct. 7, 1919.

Application filed February 3, 1919. Serial No. 274,724.

*To all whom it may concern:*

Be it known that I, KOSSUTH T. MCKINSTRY, a citizen of the United States, residing at Atlanta, in the county of Fulton and State of Georgia, have invented certain new and useful Improvements in Means for Securing Vehicle-Springs, of which the following is a specification.

The object of this invention is to provide simple, efficient and inexpensive means whereby the breaking of semi-elliptical springs employed on certain types of vehicles will be prevented. The invention seeks to provide means for the stated purpose which may be applied to the vehicle without necessitating any change in the construction or arrangement of the parts thereof.

The invention is illustrated in the accompanying drawings, in which—

Figure 1:
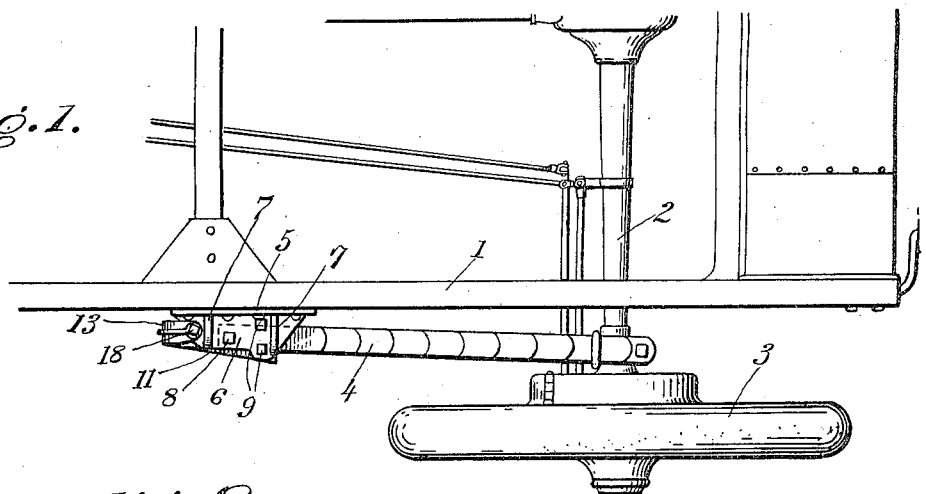
Figure 1 is a plan view of a portion of an automobile frame and running gear showing my improved device in position thereon.

Referring particularly to the drawings by reference numerals, 1 indicates a portion of the frame of an automobile, 2 the axle carrying the ground wheel 3, and 4 indicates a semi-elliptical spring having its one end secured to the axle and its other end supported by a bracket 5. The bracket 5 comprises a vertical web or flange which is riveted or bolted firmly to the side of the frame and from the lower edge of which a base or seat flange 6 extends outwardly, bracing ribs 7 being provided to form a rigid integral connection between the webs 5 and 6 so that the bracket will have strength and rigidity to properly carry the end of the spring 4. Through the web 6 of the said bracket and the extremity of the spring 4, a bolt 8 is inserted and near the extremity of the spring spaced bolts 9 are inserted through the web or seat 6 at the sides of the spring, and ordinarily washers or clip plates are provided below the spring against which nuts on the lower ends of the bolt are turned home so as to secure the spring. The parts so far described constitute the arrangement utilized for supporting the end of the spring in models of automobiles now in common use. In actual practice it has been found that the bolts 9 do not exert sufficient force to properly support the spring and the entire strain is carried by the end bolt 8, the result being that the said bolt is bent and frequently broken so that the end of the spring is left loose and merely rests upon without being secured by the clip plate bridging the bolts 9. To avoid this objectionable condition, I have devised the means shown in the accompanying drawings and which I will now describe.

Figure 2:
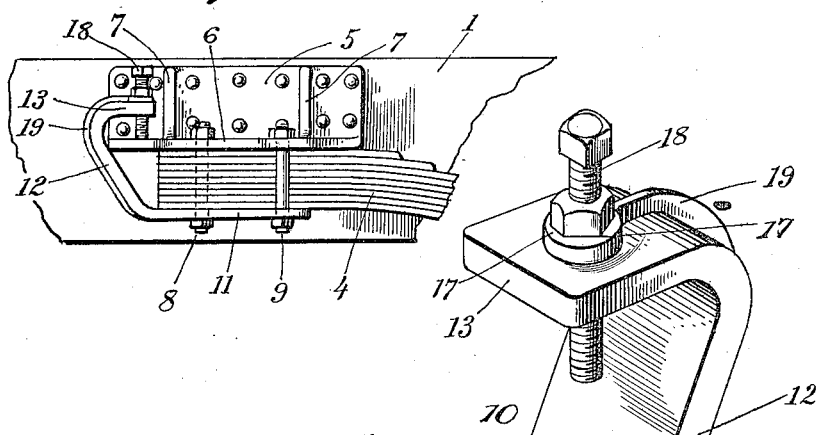
Fig. 2 is an enlarged detail side elevation of the end of the spring showing the manner of securing the same to the frame of the vehicle and the use of my invention.
Figure 3:
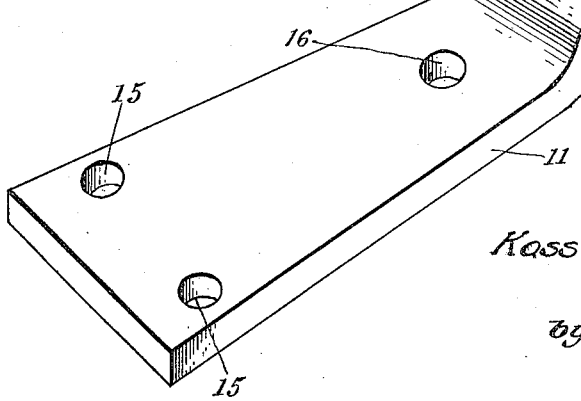
Fig. 3 is an enlarged detail perspective view of the bracket employed in the practical application of my invention.

It will be noted that the ends of the web or seat 6 of the spring-supporting bracket project beyond the reinforcing ribs 7. To reinforce and strengthen the bolts 8 and 9 and furnish an additional support for the end of the spring, I employ the bracket 10 which consists of a lower arm 11 of sufficient length to extend past the several bolts 8 and 9 and to a point in advance of the bracket 5, the end of said base member 11 being turned up to provide a web or standard 12 from the upper end of which a lip or plate 13 projects over the extremity of the web 6 of the bracket 5. In the extremity of the base member 11, I provide the openings 15 which receive the ends of the bolts 9 and near the web 12 I provide an opening 16 which receives the bolt 8, the base member 11 serving as a clamping plate to secure the end of the spring when the nuts on the respective bolts are turned home as will be readily understood on reference to Fig. 2. On the overhanging lip or plate 13, I provide a boss 17 having a threaded bore through which is engaged a stout bolt or set screw 18 which, as clearly shown in Fig. 2, is adapted to bear upon the upper surface of the web 6 and thereby support the device against dropping and also draw the lower member 11 thereof into firm engagement with the under surface of the spring. To reinforce the overhanging portion of the bracket, a strengthening rib 19 may be formed upon the outer surface thereof.

It is thought the use and advantages of my device will be readily understood from the foregoing description, taken in connection with the accompanying drawings. When my bracket or clamping plate is fitted to the end of the spring and the present supporting bracket, the end of the spring is positively and firmly supported and the strain exerted ordinarily upon the end bolt 8 is transmitted to the bracket 10 so that the tendency of the said bolt to bend or break is positively restricted and overcome. The bracket 5 is reinforced and its durability increased inasmuch as the use of my device eliminates the breaking or bending of the bracket which usually followed the breaking of the end bolt 8. My device is exceedingly simple and may be applied to vehicles now in common use by an unskilled person in a very few minutes. It is free of complicated structure so that it may be produced at a very low cost and will not add perceptibly to the dead weight of the vehicle nor detract from its sightly appearance.

Having thus described the invention, what is claimed as new is:

1. The combination with a vehicle frame, a bracket thereon, and a spring extending under the bracket, of a reinforcing member having a lower plate extending under the extremity of the spring to be secured by the spring fastening bolts and having an upper portion extending over the bracket, and a securing device fitted in said upper portion and bearing upon the bracket.

2. The combination with a vehicle frame, a spring-carrying bracket secured thereon, and a spring having its extremity disposed below said bracket, of a reinforcing member having a lower clamping plate extending under the extremity of the spring and adapted to be secured in place by the bolts which retain the end of the spring; the extremity of said plate projecting upwardly in advance of and overhanging the spring-supporting bracket, and means in the overhanging extremity of the reinforcing member to secure the same upon the said bracket.

In testimony whereof I affix my signature.

KOSSUTH T. McKINSTRY. [L. S.]